(12) United States Patent
Mabuchi

(10) Patent No.: US 7,511,275 B2
(45) Date of Patent: Mar. 31, 2009

(54) SEMICONDUCTOR DEVICE, AND CONTROL METHOD AND DEVICE FOR DRIVING UNIT COMPONENT OF SEMICONDUCTOR DEVICE

(75) Inventor: Keiji Mabuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 417 days.

(21) Appl. No.: 11/467,397

(22) Filed: Aug. 25, 2006

(65) Prior Publication Data
US 2006/0285000 A1 Dec. 21, 2006

Related U.S. Application Data

(62) Division of application No. 10/936,127, filed on Sep. 8, 2004, now Pat. No. 7,176,462.

(30) Foreign Application Priority Data
Sep. 10, 2003 (JP) ............................ P2003-317709

(51) Int. Cl.
*G01J 5/02* (2006.01)
(52) U.S. Cl. ........................ 250/340; 250/371; 250/395; 250/473.1; 348/308; 348/E3.018; 348/E3.021
(58) Field of Classification Search ...................... None
See application file for complete search history.

(56) References Cited

U.S. PATENT DOCUMENTS 4,782,394 A * 11/1988 Hieda et al. .................. 348/296
4,973,833 A * 11/1990 Takada et al. ............ 250/208.1
5,471,515 A * 11/1995 Fossum et al. ................. 377/60
5,619,262 A * 4/1997 Uno ............................ 348/297

(Continued)

FOREIGN PATENT DOCUMENTS

JP        11-075114        3/1999

(Continued)

OTHER PUBLICATIONS

Hsiu-Yu C Heng and Ya-Chin King; An Ultra-Low Dark Current CMOS Image Sensor Cell Using n+ Ring Reset; IEEE Electronic Device Letters; vol. 2, No. 9; Sep. 2002.

(Continued)

*Primary Examiner*—David E Graybill
(74) *Attorney, Agent, or Firm*—Sonnenschein Nath & Rosenthal LLP

(57) ABSTRACT

A solid-state imaging device, such as a CMOS sensor, includes a unit pixel having a charge generation unit for generating signal charge, a floating diffusion for accumulating the signal charge generated by the charge generation unit, a transfer gate transistor for transferring the signal charge in the charge generation unit to the floating diffusion, a reset transistor for resetting the floating diffusion, and an amplifying transistor for generating a signal in accordance with the signal charge generated by the charge generation unit and outputting the signal to a vertical signal line. The width of a reset pulse for driving the reset transistor is sufficiently decreased to, for example, less than or equal to ½, and preferably less than or equal to ⅕ of the response time of a signal that has occurred on the vertical signal line in response to the reset pulse.

20 Claims, 11 Drawing Sheets

U.S. PATENT DOCUMENTS

| | | | | |
|---|---|---|---|---|
| 5,625,583 | A * | 4/1997 | Hyatt | 365/45 |
| 5,891,145 | A * | 4/1999 | Morrison et al. | 250/214 R |
| 5,898,168 | A * | 4/1999 | Gowda et al. | 250/208.1 |
| 6,140,630 | A * | 10/2000 | Rhodes | 250/208.1 |
| 6,166,768 | A * | 12/2000 | Fossum et al. | 348/308 |
| 6,204,524 | B1 * | 3/2001 | Rhodes | 257/222 |
| 6,252,462 | B1 * | 6/2001 | Hoffman | 330/308 |
| 6,310,366 | B1 * | 10/2001 | Rhodes et al. | 257/185 |
| 6,316,760 | B1 * | 11/2001 | Koyama | 250/208.1 |
| 6,326,652 | B1 * | 12/2001 | Rhodes | 257/231 |
| 6,333,205 | B1 * | 12/2001 | Rhodes | 438/69 |
| 6,376,868 | B1 * | 4/2002 | Rhodes | 257/215 |
| 6,407,440 | B1 * | 6/2002 | Rhodes | 257/462 |
| 6,654,057 | B1 * | 11/2003 | Rhodes | 348/294 |
| 6,661,459 | B1 * | 12/2003 | Koizumi et al. | 348/310 |
| 6,665,013 | B1 * | 12/2003 | Fossum et al. | 348/308 |
| 6,700,610 | B1 * | 3/2004 | Kijima et al. | 348/296 |
| 6,727,946 | B1 * | 4/2004 | Zhao et al. | 348/308 |
| 6,781,178 | B2 * | 8/2004 | Shizukuishi | 257/296 |
| 6,825,878 | B1 * | 11/2004 | Rhodes | 348/308 |
| 6,850,278 | B1 * | 2/2005 | Sakurai et al. | 348/302 |
| 6,852,591 | B2 * | 2/2005 | Rhodes | 438/244 |
| 6,858,827 | B2 * | 2/2005 | Sugiyama et al. | 250/208.1 |
| 6,888,573 | B2 * | 5/2005 | Herold | 348/314 |
| 6,933,973 | B1 * | 8/2005 | Sako | 348/308 |
| 6,937,278 | B2 * | 8/2005 | Huang et al. | 348/304 |
| 6,943,838 | B2 * | 9/2005 | Fossum et al. | 348/311 |
| 6,975,356 | B1 * | 12/2005 | Miyamoto | 348/308 |
| 6,999,120 | B1 * | 2/2006 | Egawa et al. | 348/296 |
| 7,064,787 | B2 * | 6/2006 | Kijima et al. | 348/296 |
| 7,068,315 | B1 * | 6/2006 | Suzuki et al. | 348/308 |
| 7,078,746 | B2 * | 7/2006 | Hong | 257/222 |
| 7,164,445 | B2 * | 1/2007 | Kijima et al. | 348/314 |
| 7,176,462 | B2 * | 2/2007 | Mabuchi | 250/340 |
| 7,205,988 | B2 * | 4/2007 | Nakamura et al. | 345/207 |
| 7,215,368 | B2 * | 5/2007 | Inoue | 348/273 |
| 7,224,389 | B2 * | 5/2007 | Dierickx | 348/308 |
| RE39,768 | E * | 8/2007 | Rhodes | 250/208.1 |
| 7,271,835 | B2 * | 9/2007 | Iizuka et al. | 348/314 |
| 7,375,748 | B2 * | 5/2008 | Krymski | 348/241 |
| 7,417,677 | B2 * | 8/2008 | Agranov et al. | 348/308 |
| 7,446,807 | B2 * | 11/2008 | Hong | 348/308 |
| 7,456,885 | B2 * | 11/2008 | Baker | 348/308 |
| 2002/0093580 | A1 * | 7/2002 | Kijima et al. | 348/296 |
| 2002/0126214 | A1 * | 9/2002 | Kijima et al. | 348/296 |
| 2002/0175269 | A1 * | 11/2002 | Krymski | 250/208.1 |
| 2003/0063206 | A1 * | 4/2003 | Mabuchi | 348/301 |
| 2004/0008172 | A1 * | 1/2004 | Nakamura et al. | 345/89 |
| 2004/0096124 | A1 * | 5/2004 | Nakamura | 382/308 |
| 2006/0044438 | A1 * | 3/2006 | Mauritzson et al. | 348/308 |
| 2006/0092316 | A1 * | 5/2006 | Gazeley | 348/372 |
| 2006/0285000 | A1 * | 12/2006 | Mabuchi | 348/308 |

FOREIGN PATENT DOCUMENTS

| | | |
|---|---|---|
| JP | 2001-285717 | 10/2001 |
| JP | 2002-051263 | 2/2002 |
| WO | 03-069897 | 8/2003 |

OTHER PUBLICATIONS

European Search Report dated Oct. 30, 2007.
Japanese Office Action issued on Apr. 3, 2007.

* cited by examiner

SEMICONDUCTOR DEVICE, AND CONTROL METHOD AND DEVICE FOR DRIVING UNIT COMPONENT OF SEMICONDUCTOR DEVICE

RELATED APPLICATION DATA

This application is a divisional of U.S. patent application Ser. No. 10/936,127, filed Sep. 8, 2004, now U.S. Pat. No. 7,176,462, the entirety of which is incorporated herein by reference to the extent permitted by law. The present invention claims priority to Japanese patent application No. 2003-317709 filed in the Japanese Patent Office on Sep. 10, 2003, the entirety of which also is incorporated by reference herein to the extent permitted by law.

BACKGROUND OF THE INVENTION

1. Field of the Invention

The present invention relates to a semiconductor device in which a plurality of unit components is arranged, and a control method and device for driving the unit components. In particular, the present invention relates to a technology to reduce power consumption and to increase the dynamic range of a physical-quantity-distribution-sensing semiconductor device, such as a solid-state imaging device. In the physical-quantity-distribution-sensing semiconductor devices, for example, unit components, such as unit pixels, that are sensitive to externally input electromagnetic waves, such as light and radiation, are arranged in a matrix, and the physical quantity distribution is converted to electrical signals to be read out.

2. Description of the Related Art

Physical-quantity-distribution-sensing semiconductor devices, in which unit components, such as unit pixels, that are sensitive to externally input electromagnetic waves, such as light and radiation, are arranged in a line or a matrix, are being widely used in various fields. For example, in the field of imaging devices, solid-state imaging devices having charge coupled devices (CCDs), metal oxide semiconductors (MOSs), or complementary metal-oxide semiconductors (CMOSs), are used, all of which sense light as one of the physical quantities. In such semiconductor devices, unit components (unit pixels in the case of solid-state imaging devices) read out electrical signals converted from the physical quantity distribution.

In addition, the solid-state imaging devices include an active pixel sensor solid-state imaging device having pixels of active pixel sensor (APS, also referred to as a gain cell) structure. In each APS pixel, a pixel signal generation unit includes an amplifying driving transistor for generating a pixel signal in accordance with signal charge generated by a capacitance generation unit. For example, most CMOS solid-state imaging devices have such a structure. In these active pixel sensor solid-state imaging devices, to read out a pixel signal, a pixel unit having a plurality of unit pixels is controlled by an address so that any unit pixel can be selected to read out the signal therefrom. That is, the active pixel sensor solid-state imaging device is an example of an address-controlled solid-state imaging device.

For example, in the active pixel sensor, which is one type of X-Y address type solid-state imaging sensor having unit pixels in a matrix, a pixel is composed of an active element having a MOS structure (MOS transistor) to provide the pixel itself with an amplifying function. That is, the active pixel sensor reads out signal charge (photoelectrons) accumulated in a photodiode (photoelectric transducer) and amplified by the active element as image information.

In this X-Y address type solid-state imaging sensor, for example, a plurality of pixel transistors is arranged in a two-dimensional matrix to form a pixel unit. Accumulation of signal charges in accordance with incident light starts line by line or pixel by pixel. A current or voltage signal based on the accumulated signal charge is sequentially read out from each pixel by specifying the address.

Unit Pixel Structure; 4-TR Type

In general, in a complementary metal-oxide semiconductor (CMOS) sensor, a structure of a unit pixel is complicated compared to that of a charge coupled device (CCD) sensor because of reducing the noise. For example, as shown in FIG. 1A, a general-purpose CMOS sensor includes a floating diffusion amp (FDA), which is a diffusion layer having a parasitic capacitance, and four transistors in a unit pixel 3. This structure is well known and is referred to as a 4-transistor pixel structure (hereinafter also referred to as a 4TR-structure).

In this 4TR-structure, a floating diffusion 38, which is an example of a charge accumulation unit, is connected to a gate of an amplifying transistor 42, which is an example of a signal generation unit. Accordingly, the amplifying transistor 42 outputs a signal (voltage signal in this case) in accordance with a potential of the floating diffusion 38 (hereinafter also referred to as an FD potential) to a vertical signal line 53, which is an example of an output signal line, via a pixel line 51. A reset transistor 36 resets the floating diffusion 38.

A transfer gate transistor (readout selection transistor) 34 functioning as a charge transfer unit transfers signal charge generated by a charge generation unit 32 to the floating diffusion 38. A plurality of pixels is connected to the vertical signal line 53. In order to select a pixel, a vertical selection transistor 40 in a pixel to be selected is turned on. This allows only the selected pixel to be connected to the vertical signal line 53, and therefore, a signal of the selected pixel is output to the vertical signal line 53.

Thus, the unit pixel 3 generally includes a photoelectric transducer, for example, a photodiode (PD), and four transistors, one of which is the vertical selection transistor 40 for selecting a pixel. The unit pixel 3 of most current CMOS sensors has the selection transistor. Therefore, CMOS sensors have a disadvantage in terms of increasing the resolution compared to CCD sensors.

Unit Pixel Structure; 3-TR Type

On the other hand, a 3-transistor pixel structure (hereinafter also referred to as a 3TR-structure) is proposed to reduce the number of elements while maintaining the performance. As shown in FIG. 1B, to reduce a pixel size by reducing spaces occupied by transistors in the unit pixel 3, the unit pixel 3 includes a photoelectric transducer, for example, a photodiode (PD), and three transistors (refer to, for example, Japanese Patent No. 2708455). Hereinafter, this patent document is referred to as Patent Document 1.

Each unit pixel 3 of a 3TR-structure includes a charge generation unit 32, such as a photodiode, which receives light and photoelectrically converts it to generate signal charge; an amplifying transistor 42, which is connected to a vertical drain line (DRN) 57 and amplifies a signal voltage corresponding to the signal charge generated by the charge generation unit 32; and a reset transistor 36 for resetting the charge generation unit 32. Additionally, a readout selection transistor (transfer gate unit) 34 is disposed between the charge generation unit 32 and a gate of an amplifying transistor 42. The readout selection transistor 34 is scanned by a vertical shift register in a vertical scanning circuit (not shown) via a transfer gate wire (TRG) 55. That is, the unit pixel 3 of a 3TR-structure includes three transistors for transferring, resetting, and amplifying, in addition to the charge generation unit 32.

A gate of the amplifying transistor 42 and a source of the reset transistor 36 are connected to the charge generation unit 32 via the transfer gate transistor (readout selection transistor) 34. A drain of the reset transistor 36 and a drain of the amplifying transistor 42 are connected to the drain line. A source of the amplifying transistor 42 is connected to the vertical signal line 53. The transfer gate transistor 34 is driven by a transfer driving buffer 150 via the transfer gate wire (TRG) 55. The reset transistor 36 is driven by a reset driving buffer 152 via a reset gate wire (RST) 56.

Both the transfer driving buffer 150 and the reset driving buffer 152 operate by two values, the reference voltage 0 V and a power supply voltage. In particular, in a known unit pixel of this type, a low level voltage applied to the gate of the transfer gate transistor 34 is 0 V.

Pixels in the same horizontal row are connected to three signal lines, namely, the transfer gate wire (TRG) 55, the reset gate wire (RST) 56, and a vertical drain line (DRN) 57. Pixels in the same vertical column are connected to a common vertical signal line (readout signal line) 53. The amplifying transistor 42 is connected to each vertical signal line 53, which is connected to a corresponding load transistor unit (not shown). When a signal is read out, a MOS load transistor connected to each amplifying transistor 42 continuously supplies a predetermined constant current to the vertical signal line 53.

Each vertical signal line 53 is connected to a column circuit (not shown), which removes noise by using a correlated double sampling (CDS). The processed pixel signal is read out from the column circuit under the control of a horizontal scanning circuit (not shown). The pixel signal is then delivered to an amplifier circuit (an output amplifier) and is externally output.

A vertical scanning circuit (not shown) drives the transfer gate wire (TRG) 55, the reset gate wire (RST) 56, and the vertical drain line (DRN) 57 at an appropriate timing to control pixels in the same horizontal row. During readout time, the horizontal scanning circuit sequentially inputs signals to CDS processing units to turn them on. Thus, signals read out from the respective vertical signal line 53 are sequentially delivered to the output amplifier.

As in the 4TR-structure, in the unit pixel 3 of the 3TR-structure, a floating diffusion 38 is connected to a gate of an amplifying transistor 42. Accordingly, the amplifying transistor 42 outputs a signal in accordance with a potential of the floating diffusion 38 to the vertical signal line 53.

The reset gate wire (RST) 56 connected to a gate of the reset transistor 36 extends in the row (horizontal) direction, and the vertical drain line (DRN) 57 connected to a drain of the reset transistor 36 is common to all the pixels. The vertical drain line (DRN) 57 is driven by a drain driving buffer 140 (hereinafter referred to as a DRN driving buffer). The reset transistor 36 is driven by the reset driving buffer 152 to control a potential of the floating diffusion 38.

In Patent Document 1, the vertical drain line (DRN) 57 for one row is separated from that for another row. However, since the vertical drain line (DRN) 57 must allow current signals of pixels in one column to flow thereon, the vertical drain line (DRN) 57 is actually common to all rows.

Signal charge generated by the charge generation unit (photoelectric transducer) 32 is transferred to the floating diffusion 38 by the transfer gate transistor 34.

Unlike the 4TR-structure, the unit pixel 3 of a 3TR-structure does not have the vertical selection transistor 40 to be connected to the amplifying transistor 42 in series. Among a plurality of pixels connected to the vertical signal line 53, a pixel is selected not by the vertical selection transistor 40 but by controlling the FD potential.

Thus, level control of the vertical drain line (DRN) 57 functions as selection of a pixel. The vertical drain line (DRN) 57 is effectively used as a pixel selection line (SEL), which has the same function as the vertical selection line (SEL) 52 in the first example. Additionally, a pulse signal on the vertical drain line (DRN) 57, which controls both drains of the reset transistor 36 and the amplifying transistor 42, has the same function as the selection pulse SEL in the first example. Hereinafter, the pulse signal on the vertical drain line (DRN) 57 is referred to as a DRN control pulse SEL.

For example, the FD potential is usually forced to a low level (Low) by switching the vertical drain line (DRN) 57 to a low level. To select a pixel, the FD potential of the selected pixel is forced to a high level (High) by switching the vertical drain line (DRN) 57 to a high level and switching the reset transistors 36 in the selected row in order to output a signal of the selected pixel to the vertical signal line 53. Thereafter, the FD potential of the selected pixel is returned to a low level by switching the vertical drain line (DRN) 57 to a low level. This operation is performed for all the pixels in the selected row at the same time.

Thus, in order to control the FD potential, the following operations must be performed:
1) To turn the FD potential of the selected row to a high level, the vertical drain line (DRN) 57 is switched to a high level and the FD potential becomes a high level via the reset transistor 36 for the selected row.
2) To return the FD potential of the selected row to a low level, the vertical drain line (DRN) 57 is switched to a low level and the FD potential becomes a low level via the reset transistor 36 for the selected row.

FIG. 2 is an example of a timing chart of driving pulses for driving the unit pixel 3 of the 3-TR structure. By controlling the transfer gate wire (TRG) 55, the reset gate wire (RST) 56, the vertical drain line (DRN) 57 common to the pixels, the voltage of the floating diffusion 38 varies, and therefore, the voltage of the vertical signal line 53 also varies.

For example, the DRN driving buffer 140 applies a drain driving pulse DRN (high level) to the vertical drain line (DRN) 57 to switch the vertical drain line (DRN) 57 to a high level. While the vertical drain line (DRN) 57 is at a power supply voltage (high) level, a reset pulse RST (high level) is applied to the reset transistor 36 to raise the reset gate wire (RST) 56 to a high level (t1). Thus, the floating diffusion 38 is connected to the power supply voltage. Thereafter, when the reset gate wire (RST) 56 falls to a low level (t2), the voltage of the floating diffusion 38 falls due to a capacity coupling C1 between a gate (reset gate) of the reset transistor 36 and the floating diffusion 38.

This change appears on the vertical signal line 53 through the amplifying transistor 42. Therefore, a voltage of the vertical signal line 53 falls. Then, the voltage of the floating diffusion 38 further falls due to a capacity coupling C2 between the vertical signal line 53 and a gate of the amplifying transistor 42.

Due to these effects, the voltage of the floating diffusion 38 (FD voltage) decreases to lower than the power supply voltage (from t2 to t3). A downstream circuit connected to the vertical signal line 53 receives the voltage of the vertical signal line 53 (reset level), which corresponds to this FD voltage.

Subsequently, when a transfer gate pulse TRG (high level) is applied to the transfer gate transistor 34 (from t3 to t4), the charge generation unit 32 transfers signal charge (photoelectrons) to the floating diffusion 38 to decrease the voltage of the floating diffusion 38, and therefore, the voltage of the vertical signal line 53 also decreases with the decrease of the voltage of the floating diffusion 38 (from t4 to t5). The downstream circuit also receives this voltage of the vertical signal line 53 (signal level).

Thereafter, when the vertical drain line 57 is switched to a low level and a reset pulse RST is applied to the reset transistor 36 (from t5 to t6), the floating diffusion 38 returns to a low level (after t5). The downstream circuit calculates the difference between the reset level and the signal level to output it as a pixel signal.

However, this type of driving decreases the voltage of the floating diffusion 38 after resetting due to the capacity couplings C1 and C2 (from t2 to t3). Accordingly, a high power supply voltage is required to compensate for the decrease, that is, lower levels of voltage cannot be used, and therefore, low power consumption and wide dynamic range cannot be provided, which are problems.

A pixel unit 3 of the 4-TR structure that has the vertical selection transistor 40 in series to the amplifying transistor 42 may increase the voltage of the floating diffusion 38 to use lower levels of voltage, as is disclosed, for example, in Japanese Unexamined Patent Application Publication No. 2003-87662.

However, a pixel unit 3 of the 3-TR structure that does not have such a selection transistor cannot employ this technique.

It is more preferable that even a pixel unit 3 of the 4-TR structure that has a selection transistor further decreases power consumption and increases the dynamic range.

SUMMARY OF THE INVENTION

Accordingly, it is an object of the present invention to provide a structure of a semiconductor device and a driving method for decreasing power consumption and increasing the dynamic range, regardless of a unit pixel of the 3TR-structure and 4TR-structure, that is, regardless of the presence of a selection transistor.

According to the present invention, a semiconductor device includes a signal acquisition unit and a driving control unit. The signal acquisition unit includes a unit component having a charge generation unit for generating signal charge in response to incident electromagnetic waves, a charge accumulation unit for accumulating the signal charge generated by the charge generation unit, a signal generation unit for generating a signal in accordance with the signal charge accumulated in the charge accumulation unit, and a reset unit for resetting the charge accumulation unit. The driving control unit uses control pulses to cause the charge accumulation unit to go to a reset level so as to increase an amount of charge to be accumulated in the charge accumulation unit.

According to the present invention, a driving control method drives a unit component of a semiconductor device. The unit component includes a charge generation unit for generating signal charge in response to incident electromagnetic waves, a charge accumulation unit for accumulating the signal charge generated by the charge generation unit, a signal generation unit for generating a signal in accordance with the signal charge accumulated in the charge accumulation unit, and a reset unit for resetting the charge accumulation unit. The method includes a step of using control pulses to cause the charge accumulation unit to go to a reset level so as to increase an amount of charge to be accumulated in the charge accumulation unit.

According to the present invention, a driving control device for driving a unit component of a semiconductor device includes a driving control unit. The unit component includes a charge generation unit for generating signal charge in response to incident electromagnetic waves, a charge accumulation unit for accumulating the signal charge generated by the charge generation unit, a signal generation unit for generating a signal in accordance with the signal charge accumulated in the charge accumulation unit, and a reset unit for resetting the charge accumulation unit. The driving control unit uses control pulses to cause the charge accumulation unit to go to a reset level so as to increase an amount of charge to be accumulated in the charge accumulation unit.

According to the present invention, a camera includes a signal acquisition unit, a driving control unit, and an optical system. The signal acquisition unit includes a unit component having a charge generation unit for generating signal charge in response to incident electromagnetic waves, a charge accumulation unit for accumulating the signal charge generated by the charge generation unit, a signal generation unit for generating a signal in accordance with the signal charge accumulated in the charge accumulation unit, and a reset unit for resetting the charge accumulation unit. The driving control unit uses control pulses to cause the charge accumulation unit to go to a reset level so as to increase an amount of charge to be accumulated in the charge accumulation unit. The optical system guides the electromagnetic waves to the signal acquisition unit.

DESCRIPTION OF THE PREFERRED EMBODIMENTS

Embodiments of the present invention will be described below in detail with reference to the accompanying drawings. Hereinafter, embodiments using a device of a CMOS imaging sensor, which is one example of X-Y address type solid-state imaging devices, will be described. Also, all pixels of the CMOS imaging sensor are composed of NMOS. However, this is only an example. The device is not limited to a MOS-type imaging device. All embodiments described below are applied to all the physical-quantity-distribution-sensing semiconductor devices in which a plurality of unit components is sensitive to externally input electromagnetic waves, such as light and radiation, and is arranged in a line or a matrix. Also, it should be noted that, in the embodiments according to the present invention, the words "row" and "column" used for directions of pixel arrangement and lines represent the horizontal direction and the vertical direction of the matrix, respectively. However, the present invention is not limited to these arrangements of the components. Signals delivered from a pixel to the outside of an imaging region may be read out via a signal line disposed in the horizontal direction. In general, the directions of the "row" and "column" depend on the definitions thereof. For example, if the "row" represents the vertical direction, the words "row" and "column" used in the present invention should be interchanged with each other.

Structure of Solid-state Imaging Devices; First Embodiment

Figure 3A:
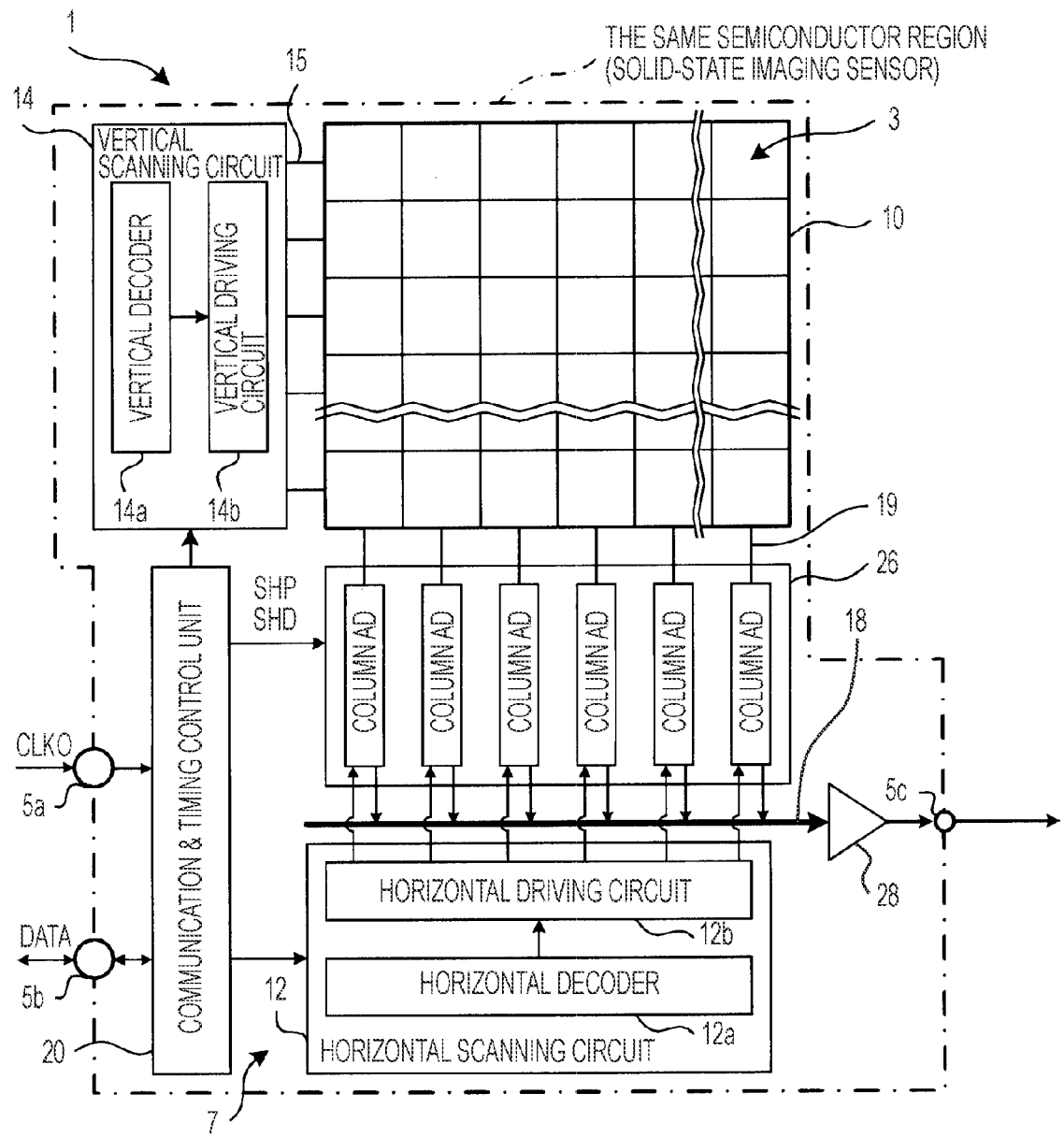
FIGS. 3A and 3B are schematic block diagrams of a CMOS solid-state imaging device according to a first embodiment of the present invention.
Figure 3B:
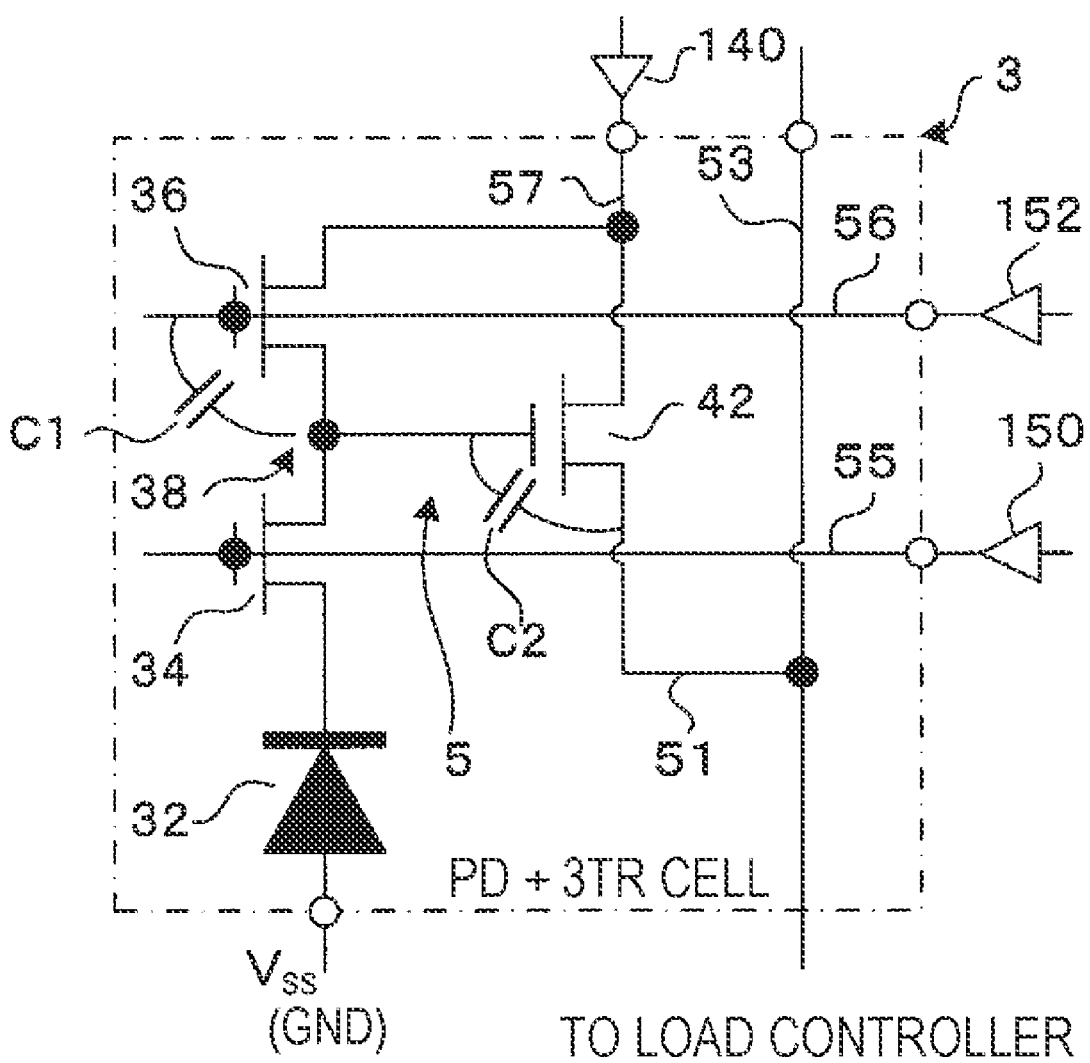

FIGS. 3A and 3B are schematic block diagrams of a CMOS solid-state imaging device according to a first embodiment of the present invention. The solid-state imaging device 1 has a pixel unit in which a plurality of pixels, each of which has a photoreceptor (an example of a charge generation unit), is arranged in rows and columns, that is, in a two-dimensional matrix. The photoreceptor outputs a signal in accordance with the intensity of incident light. Signal output from each pixel is a voltage signal, and a correlated double sampling (CDS) processing function unit and a digital converter are disposed for each column. That is, the device is of a column type.

That is, as shown in FIG. 3A, the solid-state imaging device 1 includes a pixel unit (imaging unit) 10 in which a plurality of unit pixels 3 is arranged in rows and columns, a driving control unit 7, and a column processing unit 26, both of which are disposed at the periphery of the pixel unit 10. The driving control unit 7 includes, for example, a horizontal scanning circuit 12 and a vertical scanning circuit 14.

Figure 1A:
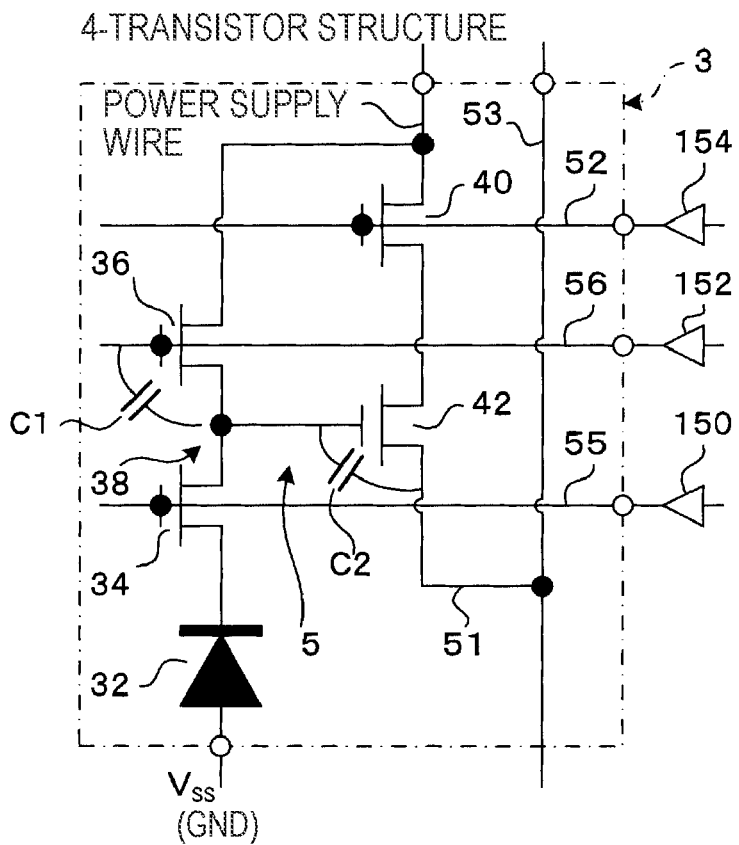
FIGS. 1A and 1B show a structure of a unit pixel of CMOS sensors.
Figure 1B:
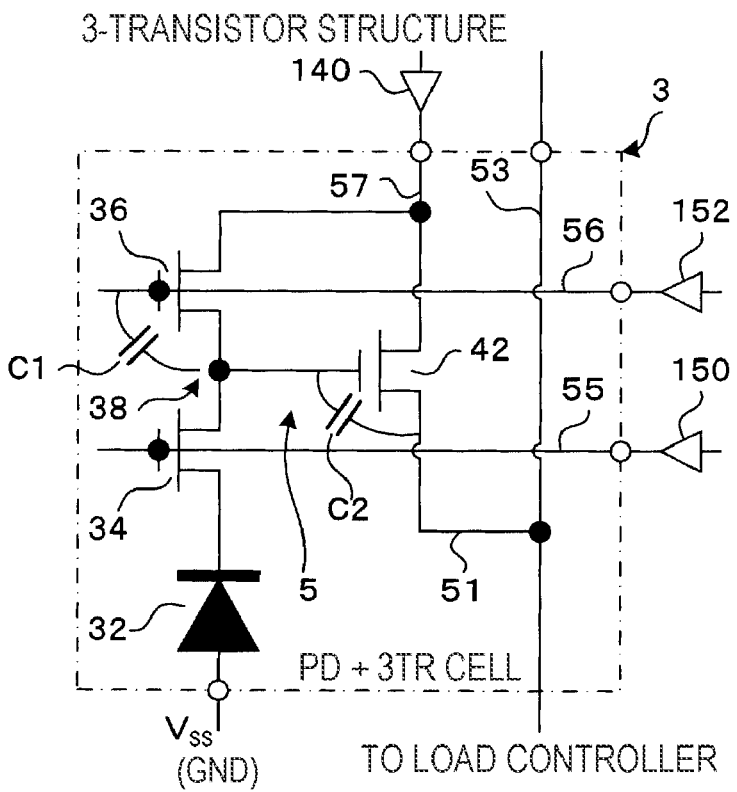

Although all the rows and columns are not shown in FIGS. 3A and 3B for the sake of simplicity, dozens to thousands of pixels are actually arranged in each row and each column. As shown in FIG. 3B, the structure of the unit pixel 3 is identical to that of the 3-transistor structure shown in FIG. 1B and described in the "Description of the Related Art" section of this specification. The vertical drain line 57 is common to almost all pixels in the pixel unit 10. Branches of the vertical drain line 57 extend in the column direction and are connected together at the end of the pixel unit 10, or extend so as to form a lattice which is open above each charge generation unit 32.

The driving control unit 7 of the solid-state imaging device 1 further includes a horizontal scanning circuit 12, a vertical scanning circuit 14, and a communication & timing control unit 20. These components of the driving control unit 7 are integrally formed with the pixel unit 10 in a semiconductor region, such as single-crystal silicon, using the same technology as in semiconductor integrated circuit manufacturing technology. The integrated components function as the solid-state imaging device (imaging device), which is an example of a semiconductor system.

The unit pixel 3 is connected, via a vertical control line 15, to the vertical scanning circuit 14 which selects a vertical column of pixels. Also, the unit pixel 3 is connected, via a vertical signal line 19, to the column processing unit 26, in which a column AD circuit is disposed for each column. Herein, the vertical control line 15 refers to all types of lines from the vertical scanning circuit 14 to the pixel.

As will be described below, each of the horizontal scanning circuit 12 and the vertical scanning circuit 14 includes a decoder and starts a shift operation (scanning) in response to a driving pulse delivered from the communication & timing control unit 20. For this purpose, the vertical control line 15 includes various types of pulse signals, for example, a reset pulse RST, a transfer pulse TRG, and a DRN control pulse DRN.

Although not shown, the communication & timing control unit 20 includes a pulse signal generation unit for generating a clock required for each component and a pulse signal at a predetermined timing. For example, the pulse signal generation unit includes a functional block (an example of a driving control device) for supplying a pulse signal to the horizontal scanning circuit 12, the vertical scanning circuit 14, and the column processing unit 26 at a predetermined timing; and a functional block of a communication interface for receiving data that provides instructions to determine a clock signal and an operation mode and for outputting data containing information of the solid-state imaging device 1. For example, the communication & timing control unit 20 outputs a horizontal address signal to a horizontal decoder 12a, and a vertical address signal to a vertical decoder 14a. Upon receipt of the signal, the horizontal decoder 12a and the vertical decoder 14a select the corresponding column and the corresponding row, respectively.

According to this embodiment, the communication & timing control unit 20 supplies a clock CLK1, which has the same frequency of an input clock CLK0 (master clock) input from a terminal 5a, a divided-by-2 clock of the master clock, or a more divided slow clock to components in the device, for example, to the horizontal scanning circuit 12, the vertical scanning circuit 14, the column processing unit 26, and a output circuit 28. Hereinafter, the divided-by-2 clock and a clock having a lower frequency than the divided-by-2 clock are collectively referred to as a slow clock CLK2.

For example, solid-state imaging devices in VGA class size (about 300,000 pixels) receive an input clock of 24 MHz, operate internal circuits with the clock CLK1 of 24 MHz or the slow clock CLK2 of 12 MHz, and output frames at a rate of 30 frames/s (fps). As used herein, "VGA" is the abbreviation for "Video Graphics Array", which defines a graphics mode and a display resolution.

The vertical scanning circuit 14 selects a row of the pixel unit 10, and supplies pulses required for the row. For example, the vertical scanning circuit 14 includes the vertical decoder 14a, which determines a readout row (a row of the pixel unit 10) in the vertical direction, and a vertical driving circuit 14b which drives a unit pixel 3 at a readout address (in the row direction) determined by the vertical decoder 14a by supplying a pulse to a control line corresponding to the unit pixel 3. Also, the vertical decoder 14a selects a row for an electronic shutter in addition to the row from which signals are read out.

The horizontal scanning circuit 12 sequentially selects a column AD circuit in the column processing unit 26 in synchronization with a slow clock, and leads a signal from the column AD circuit to a horizontal signal line 18. For example, the horizontal scanning circuit 12 includes the horizontal decoder 12a which determines a read-out column in the horizontal direction, that is, which selects one of the column circuits in the column processing unit 26, and a horizontal driving circuit 12b which leads each signal of the column processing unit 26 to the horizontal signal line 18 in accordance with a readout address determined by the horizontal decoder 12a. The number of horizontal signal lines 18 is determined by the number of bits n (where n is a positive integer) that the column AD circuit handles. For example, if n is 10, 10 horizontal signal lines 18 are disposed.

In the solid-state imaging device 1 of this structure, a pixel signal (in this case, a voltage signal) output from each unit pixel 3 is delivered to a column AD circuit for the corresponding vertical column via the vertical signal line 19. Each column AD circuit in the column processing unit 26 receives signals from pixels in the column and processes them. For example, the column AD circuit calculates a difference between a signal level and a reset level (signal level immediately after a pixel reset), both of which are levels of pixel signals in a voltage mode input via the vertical signal line 19 based on two sample pulses SHP and SHD from the communication & timing control unit 20. This process eliminates noise signal components called fixed pattern noise (FPN) and reset noise. Additionally, an auto gain control (AGC) circuit, which amplifies a signal when needed, may be connected downstream of the column processing unit 26 in the same semiconductor region as the column processing unit 26.

Each column AD circuit also includes an analog-digital converter (ADC) circuit, which converts, for example, the processed analog signal to 10-bit digital data by using the slow clock CLK2. The digitized pixel data are delivered to the horizontal signal lines 18 via a horizontal selection switch (not shown) driven by a horizontal selection signal from the horizontal scanning circuit 12. The pixel data are then input to the output circuit 28. The 10-bit digital data is only an example. The number of bits may be smaller than 10 (for example, 8) or greater than 10 (for example, 14).

The output circuit 28 processes the signal from the horizontal signal line 18 and outputs it as image data via an output terminal 5c. For example, the output circuit 28 may only carry out buffering, or may carry out a black level adjustment, a line variation correction, signal amplification, and a color process before buffering.

In this embodiment, each column circuit has the AD conversion function and generates digital data for each vertical line. However, another component may have the AD conversion function instead of the column circuit. For example, each pixel of the pixel unit may have the AD conversion function. That is, the pixel unit may have a large number of functions. Alternatively, an analog pixel signal may be output to the horizontal signal line 18, and then may be AD-converted to a digital signal, which may be delivered to the output circuit 28.

In any above-described structure, the pixel unit 10, in which photoreceptors functioning as a charge generation unit are arranged in a matrix, sequentially outputs pixel signals row by row. Thus, one picture, that is, a frame image corresponding to the pixel unit 10 is represented by a set of pixel signals from the entire pixel unit 10.

Figure 2:
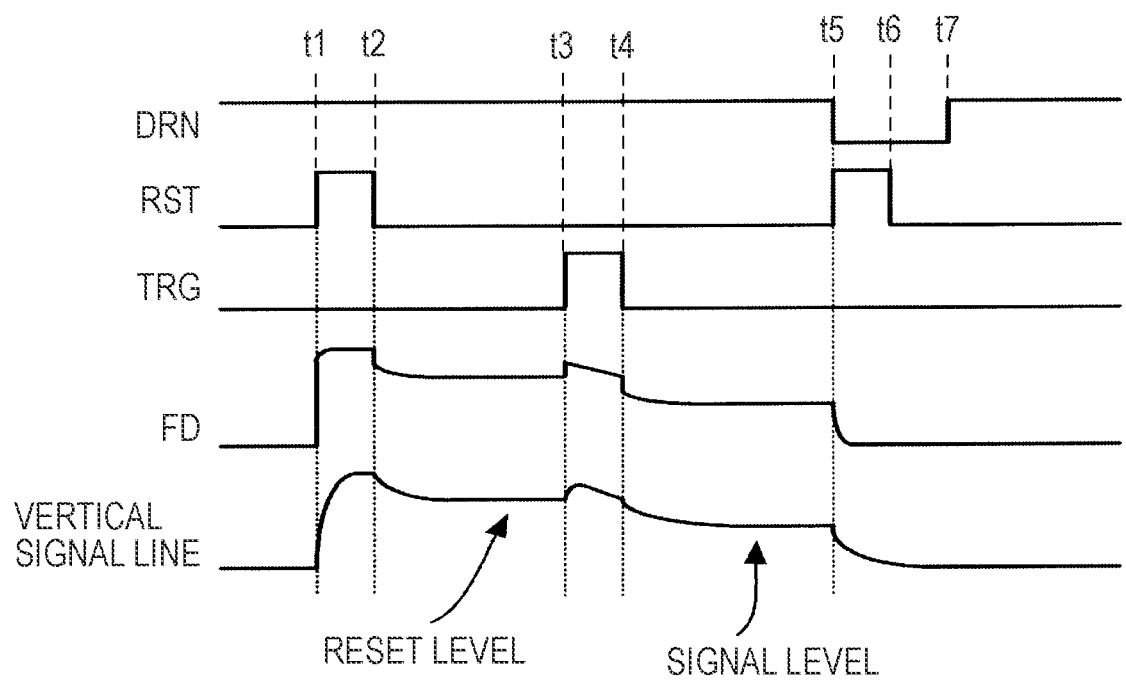
FIG. 2 is an example of a timing chart of driving pulses for driving a pixel unit of the 3TR-structure.

In the solid-state imaging device 1 of this structure, the driving timing to read out a pixel signal is similar to that in the known 3TR-structure shown in FIG. 2. However, the difference is that, in this embodiment, a driving time by a control pulse to switch the floating diffusion 38, which is an example of a charge accumulation unit, to a reset level is significantly shorter than the response time of the vertical signal line 53 to respond to the control pulse.

A first embodiment is characterized in that the unit pixel 3 has the 3TR-structure, the reset pulse RST for driving the reset transistor 36 corresponds to the control pulse for switching the floating diffusion 38 to a reset level, and the reset pulse RST is significantly short so as to increase a charge amount accumulated in the floating diffusion 38.

Driving Method of 3TR-structure; First Example

Figure 4:
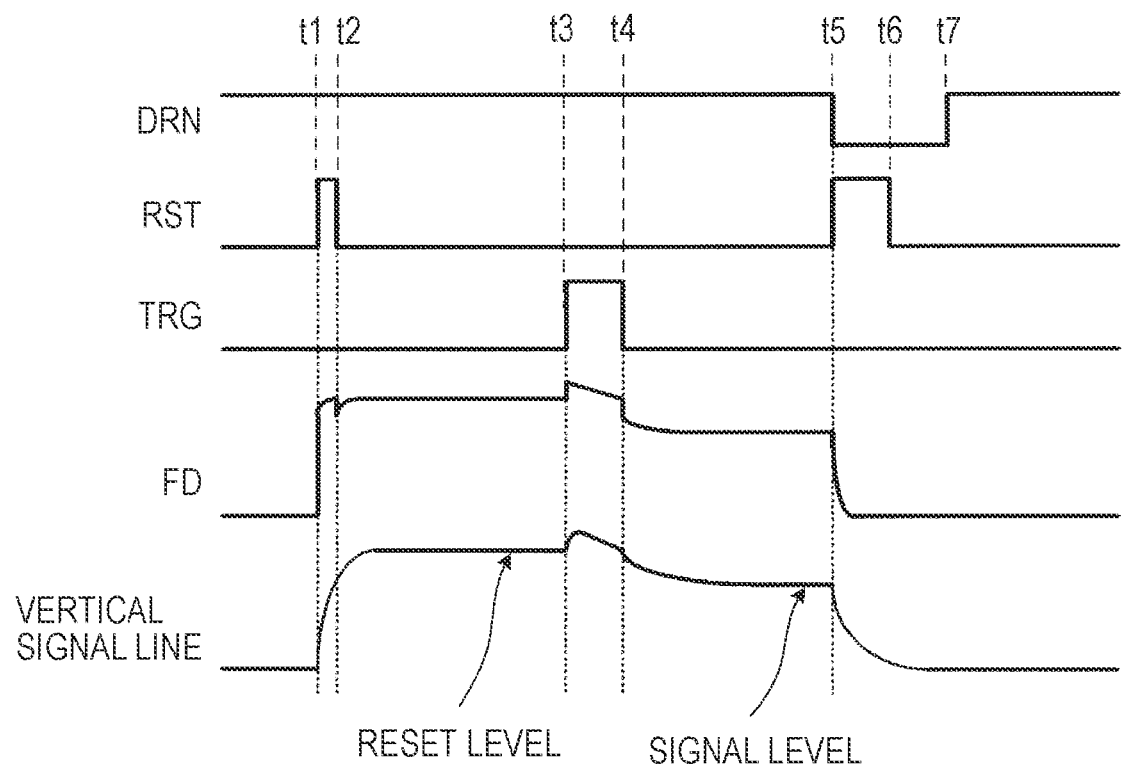
FIG. 4 is a timing chart of a first example of a driving method during reading out of signal charge according to the first embodiment.

FIG. 4 is a timing chart of a first example of a driving method according to the first embodiment when signal charge is read out. FIG. 4 shows, in particular, waveform patterns of driving pulses on the transfer gate wire (TRG) 55, the reset gate wire (RST) 56, and the vertical drain line (DRN) 57. For all the pulses, a low level "L" causes the wires to be disabled (inactive) and a high level "H" causes the wires to be enabled (active).

In the known method, as shown in FIG. 2, the width of the reset pulse RST is determined considering the response time of the vertical signal line 53 so that the vertical signal line 53 can track the reset pulse RST. In contrast, in the first embodiment, as shown by a period from t1 to t2 in FIG. 4, the width of the reset pulse RST is determined so that the width of the reset pulse RST is shorter than the response time of the vertical signal line 53. Accordingly, although the unit pixel 3 of the 3TR-structure has no selection transistor and is selected by controlling the potential of the floating diffusion 38, the potential of the floating diffusion 38 can be increased. The principal will be described next in detail with reference to the timing chart of FIG. 4.

Firstly, as in the known method, when the reset pulse RST rises (t1), the voltage of the floating diffusion 38 reaches a power supply voltage at a sufficiently fast speed, for example, in several nanoseconds (ns). That is, the floating diffusion 38 functioning as a charge accumulation unit is sufficiently reset. In contrast, the response time of the vertical signal line 53 is long, for example, more than 100 ns.

Subsequently, after the floating diffusion 38 reaches the power supply voltage, the reset pulse RST falls while the vertical signal line 53 tracks it (t2). At that time, the voltage of the floating diffusion 38 is decreased by the capacity coupling (C1 in FIG. 3B) between the floating diffusion 38 and a gate (reset gate) of the reset transistor 36. This is identical to the known method.

However, since the voltage of the vertical signal line 53 still rises, the capacity coupling (C2 in FIG. 3B) between the vertical signal line 53 and the amplifying transistor 42 causes the voltage of the floating diffusion 38 to rise. Thus, the voltage of the floating diffusion 38 rises higher than that in the known method. Accordingly, a reset level corresponding to the voltage also becomes higher. This increases a charge amount accumulated in the floating diffusion 38.

The width of the reset pulse RST could be significantly shorter than the response time of the vertical signal line 53 to the reset pulse RST functioning as a driving control pulse. Herein, the word "significantly" means a level at which, in a practical environment, the width of the reset pulse RST is sufficiently shorter than the response time of the vertical signal line 53 so as to increase a charge amount accumulated in the floating diffusion 38. Additionally, since the response time of the vertical signal line 53 depends on distributed capacity (the capacity coupling C1 and C2 shown in FIG. 3B), the distributed capacity must be considered.

The response time of the vertical signal line 53 may be, for example, the 90% response time. As used herein, the 90% response time refers to a time taken for the vertical signal line 53 to reach 90% of its maximum level starting from pulse application, where a level from an initial value (complete low level) to a final value (complete high level) is 100%. This is the same definition used for a transient response of an ordinary pulse signal.

The condition "To drive the reset transistor 36 in a significantly shorter time than the response time of the vertical signal line 53 to the reset pulse RST" can be precisely defined using a rate (multiple number) of the width of reset pulse RST relative to that used in a known driving method, the rate corresponding to the number of pixels (more particularly, a driving frequency and a master clock), a rate relative to the response time of the vertical signal line 53 in a specific device, or the pulse width of the reset pulse RST itself, among others.

In any event, the definition can be employed as long as it improves the problem that a high power supply voltage is required, that is, lower levels of voltage cannot be used and, therefore, low power consumption and a wide dynamic range cannot be achieved.

In this case, while the reset pulse RST is active (a high level in this embodiment), that is, while the reset transistor 36 is on, the floating diffusion 38 is preferably reset to the power supply voltage level, that is, the floating diffusion 38 functioning as the charge accumulation unit is preferably reset sufficiently.

This is because, if the width of the reset pulse RST is extremely small and, therefore, the floating diffusion 38 is not sufficiently reset during the active period, the floating diffusion 38 sometimes outputs a large resetting variation to the output signal when the floating diffusion 38 tracks the reset pulse RST. In order to sufficiently reset the floating diffusion 38, a gate voltage of the reset transistor 36 is preferably increased, or a deep-depletion mode transistor is preferably used as the reset transistor 36.

For example, in a device structure in which the vertical signal line 53 requires a response time of about 100 ns, a width of the reset pulse RST that is a half (50%) of the response time, i.e., 50 ns, can provide the above-described advantage. Of course, the width may be smaller than that value. If, for example, a master clock CLK0 is 25 MHz, a width of one clock is 40 ns and a width of a half clock is 20 ns. These clocks can be used as the pulse signals without modification. If a pulse width smaller than those pulse widths is needed, a delay circuit, for example, can generate it.

Figure 5:
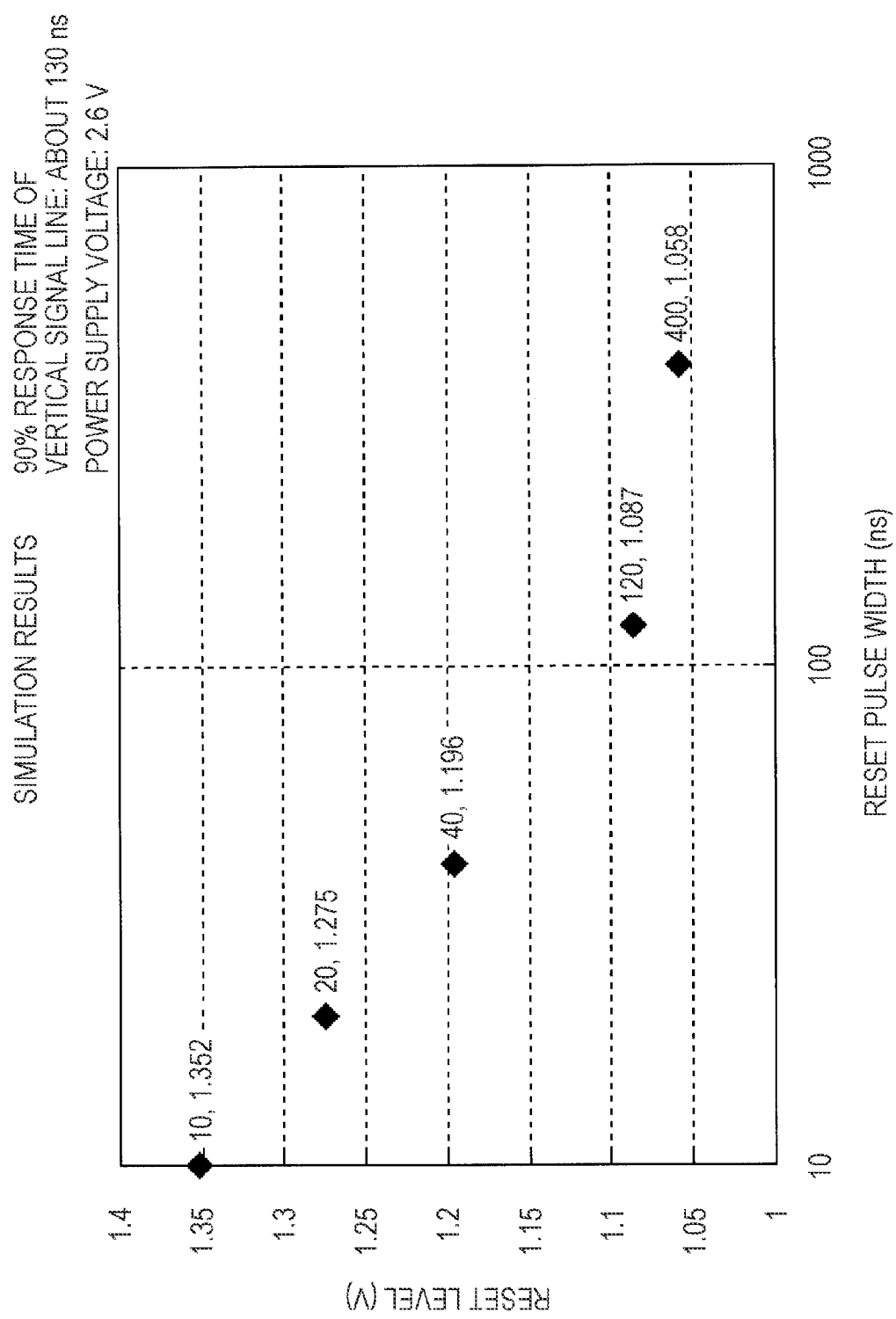
FIG. 5 shows a simulation result when the first example of the driving method is applied to a device of the 3TR-structure.

FIG. 5 shows a simulation result of an actual device of the 3TR-structure when the first example of the driving method is applied. In the drawing, a number immediately after the sign "♦" represents a pulse width. As the device, a CMOS sensor of the VGA standard (640-by-480, about 300,000 pixels) was used. The unit pixel 3 was of the 3TR-structure type and its pixel pitch was 4.1 μm. The input clock frequency was 24 MHz. The power supply voltage of the device was 2.6 V. The 90% response time of the vertical signal line 53 was about 130 ns.

As can be seen from FIG. 5, the reset level is increased if a width of the reset pulse RST is smaller than or equal to 130 ns, which is the response time of the vertical signal line 53. If a width of the reset pulse RST is smaller than about 65 ns, which is a half (½) of the response time of the vertical signal line 53, the reset level is remarkably increased. Furthermore, if a width of the reset pulse RST is smaller than or equal to 26 ns, which is a ⅕ of the response time of the vertical signal line 53, the reset level is extremely increased. For example, the pulse width of 20 ns increases the reset level by about 200 mV, and the pulse width of 10 ns increases the reset level by about 300 mV. Additionally, even though a width of the reset pulse RST is 10 ns, the floating diffusion 38 reaches the power supply voltage during the pulse width period.

In the device used for the simulation, the master clock CLK0 is 24 MHz and the width of a half clock is 20 ns. Accordingly, from a view point of a width of the reset pulse RST, less than one clock (40 ns) provides a remarkable increase and less than a half clock (20 ns) provides an extreme increase.

As can be seen from the foregoing, in the unit pixel 3 of the 3TR-structure which has no selection transistor and which is selected by controlling the potential of the floating diffusion 38, by using the first example of the first embodiment, the charge amount accumulated in the floating diffusion 38 can be increased due to the above-described voltage increase effect. Accordingly, the power supply voltage can be decreased, that is, lower levels of voltage can be used, and a wide operational margin can be provided.

Thus, the power consumption can be decreased. Additionally, if a power supply voltage at the same level as the known method is used, the dynamic range of the floating diffusion 38 can be increased. The wide dynamic range provides imaging signals at a sufficient signal level although, for example, the pixel size must be reduced in order to increase the number of pixels or in order to reduce the chip size (hereinafter referred to as a "pixel size shrink"). To obtain lower levels of voltage and the pixel size shrink, this is an excellent technology for maintaining a dynamic range of the floating diffusion 38.

Driving Method of 3TR-structure; Second Example

Figure 6:
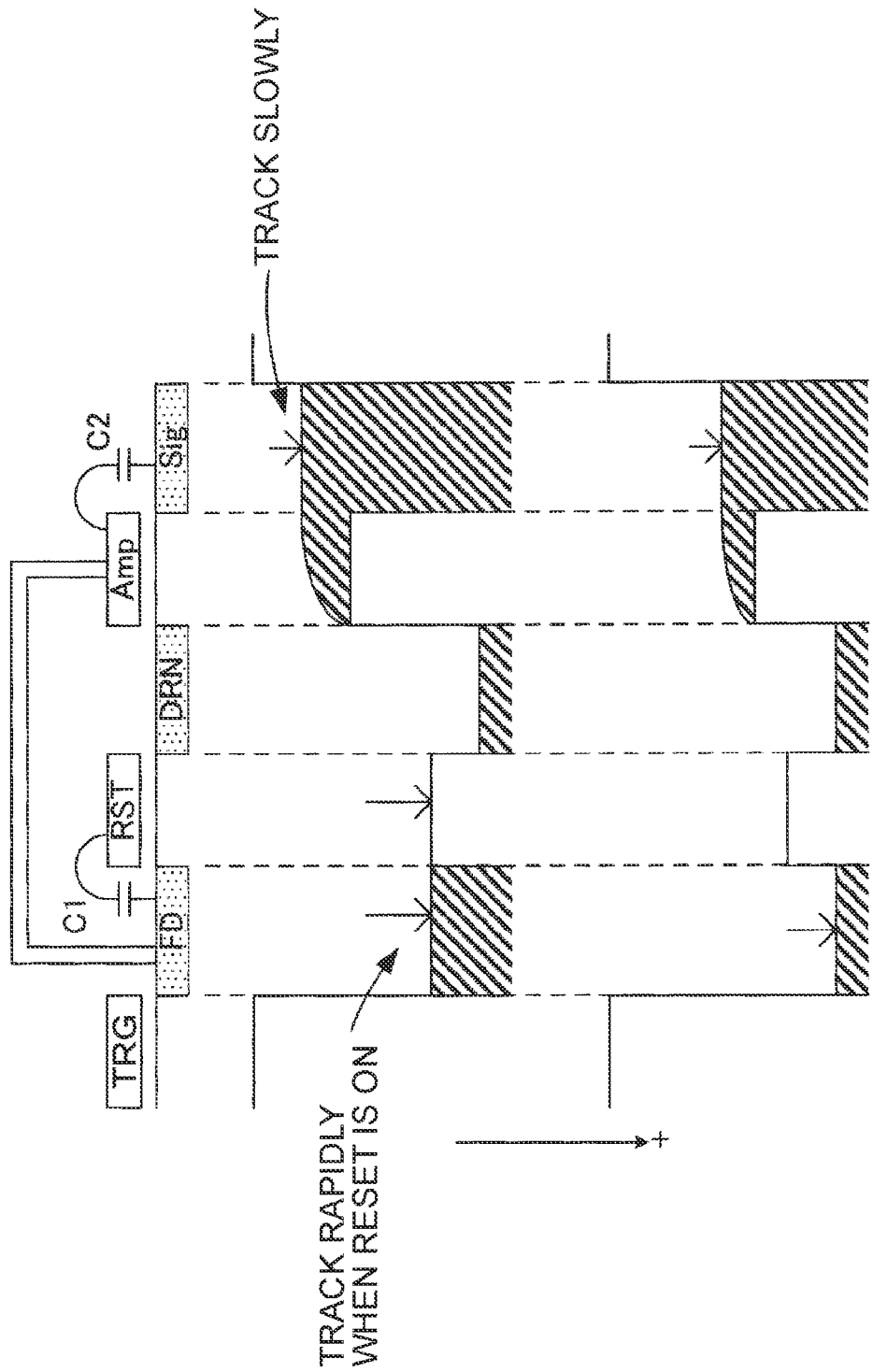
FIG. 6 is a diagram for explaining a second example of the driving method during reading out of signal charge according to the first embodiment.

FIG. 6 is a diagram for explaining a second example of a driving method according to the first embodiment when signal charge is read out. FIG. 6 shows voltage potentials in the second example of the driving method.

The second example of a driving method is characterized in that a reset process of the floating diffusion 38 is carried out while the reset transistor 36 is in a "Vth drop" so that the voltage of the floating diffusion 38 increases even though the width of the reset pulse RST is long. As used herein, the "Vth drop" refers to a state in which, even when a voltage of a high level is applied to a gate of a transistor, a potential of the gate is lower than a potential of a drain of the transistor. The method will be described below in detail.

For example, it is assumed that driving pulses are identical to those of the known example shown in FIG. 2. In the first example of a driving method, the floating diffusion 38 is connected to a power supply voltage for a drain of the amplifying transistor 42 during the first reset high period (from t1 to t2). In contrast, in this second example of a driving method, driving conditions are determined so that the reset transistor 36 is in a Vth drop when the reset transistor 36 is on.

For example, as shown in FIG. 6, when the RST goes high, the floating diffusion 38 tracks the change rapidly, while the vertical signal line 53 tracks the change slowly. Accordingly, the voltage of the floating diffusion 38 becomes the voltage of a Vth drop immediately after the RST goes high. Thereafter, as the vertical signal line 53 tracks the change, the voltage of the floating diffusion 38 is increased by the capacity coupling C2 between the amplifying transistor 42 and the vertical signal line 53. The increased FD voltage may be lower or higher than the power supply voltage.

Herein, the condition that "the reset transistor 36 is in a Vth drop when the reset pulse RST is at a high level, i.e., when the reset transistor 36 is on" is preferably in a range in which a charge amount of the floating diffusion 38 can be higher than that in a Vth drop of the reset transistor 36. At that time, a channel voltage of the reset transistor 36 ranges from the power supply voltage for a drain of the reset transistor 36 to a second voltage lower than the power supply voltage. Here, the "second voltage" is, for example, slightly lower than the power supply voltage. For example, the second voltage is lower than the power supply voltage by 0.3 to 0.7 V, and more preferably, by about 0.5 V. Of course, if the reset transistor 36 is in a Vth drop, other values of the second voltage provide an effect of increased voltage.

This effect is provided for a pixel not having a vertical selection transistor only when the floating diffusions 38 in all pixels connected to the vertical signal line 53 are at a low level in advance and the vertical signal line 53 is also at a low level until the selected row is reset.

Subsequently, when the RST returns to a low level (t2), the voltage of the floating diffusion 38 is decreased by the capacity coupling C1 between the gate (reset gate) of the reset transistor 36 and the floating diffusion 38. This is identical to the known method.

In the reset process without a Vth drop as in the first example of a driving method, although the capacity coupling C1 attempts to increase the voltage of the floating diffusion 38, the voltage of the floating diffusion 38 cannot rise, since the floating diffusion 38 is connected to the drain of the amplifying transistor 42 having the power supply voltage.

Figure 7:
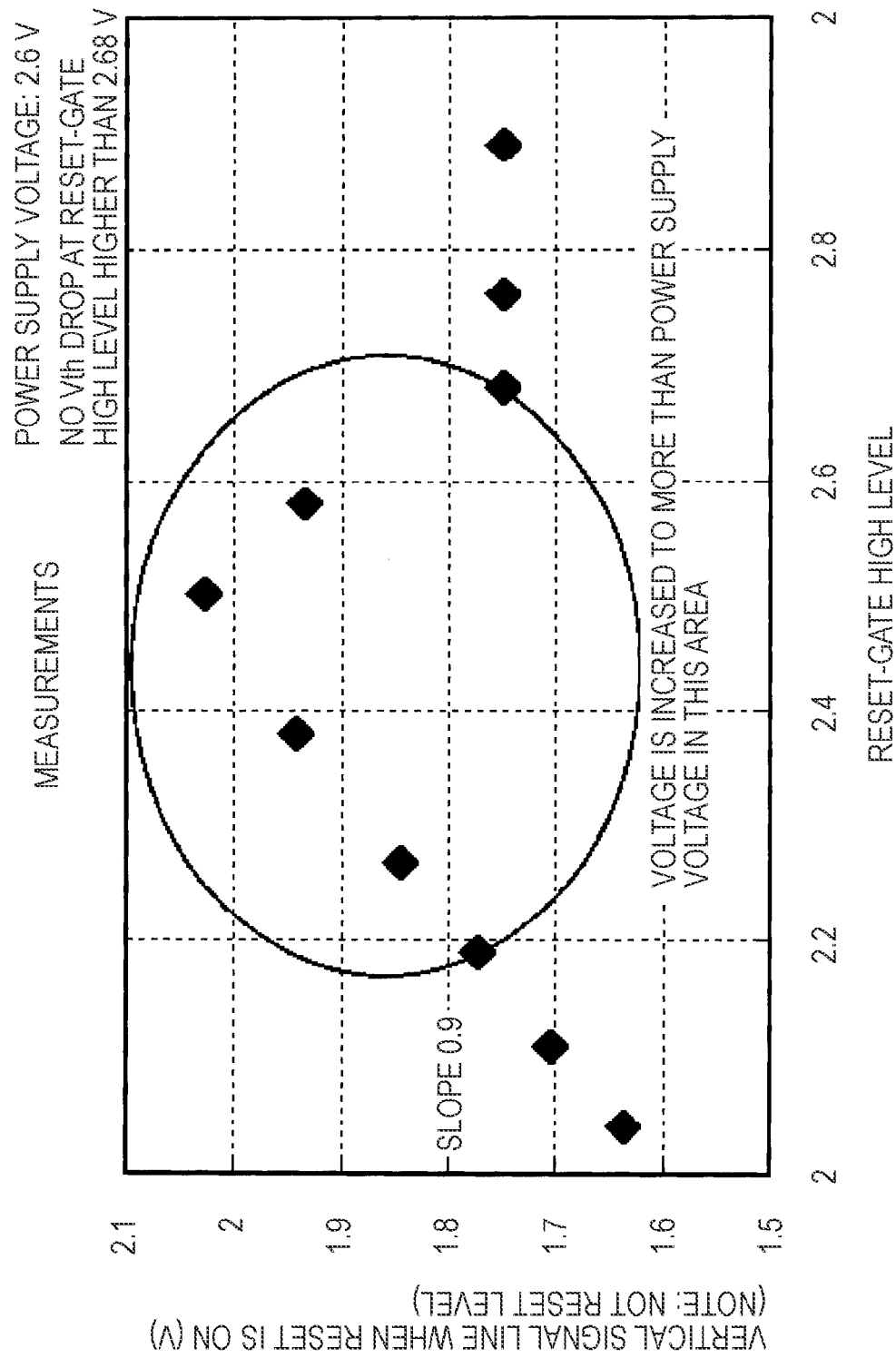
FIG. 7 shows measurements using an actual pixel when the second example of the driving method is applied to a device of the 3TR-structure.

FIG. 7 shows measurements of the second example of the driving method using an actual pixel of the 3TR-structure device. As in the simulation shown in FIG. 5, a CMOS sensor of the VGA standard (640-by-480, about 300,000 pixels) was used as the target device. The unit pixel 3 was of the 3TR-structure type and its pixel pitch was 4.1 µm. The input clock frequency was 24 MHz. The power supply voltage of the device was 2.6 V.

In the measurements shown in FIG. 7, voltages output from the vertical signal line 53 are plotted by varying a voltage of the reset on pulse during a sufficiently long reset pulse period. It can be seen that, when a high level of the reset signal varies, a level higher than 2.68 V does not cause a Vth drop.

It is considered that, when the high level of the reset signal is decreased under 2.68 V, a Vth drop occurs and a voltage of the vertical signal line 53 falls. However, as shown by a circle in the drawing, the measurements indicate that the reset level rises higher than that when a Vth drop does not occur in the range of about 2.1 V (power supply voltage 2.6 V−about 0.5 V) and about 2.68 V (power supply voltage 2.6 V+0.08 V), due to the effect of a voltage increase of the second example of a driving method.

Therefore, in the unit pixel 3 of the 3TR-structure which has no selection transistor and which is selected by controlling the potential of the floating diffusion 38, by using this range of voltage when designing, the power supply voltage can be decreased lower than that in the case where a high level of the reset signal is higher than or equal to 2.68 V. Accordingly, as in the first example of the driving method, power consumption can be decreased. If a power supply voltage at the same level as the known method is used, the dynamic range can be increased.

Figure 8A:
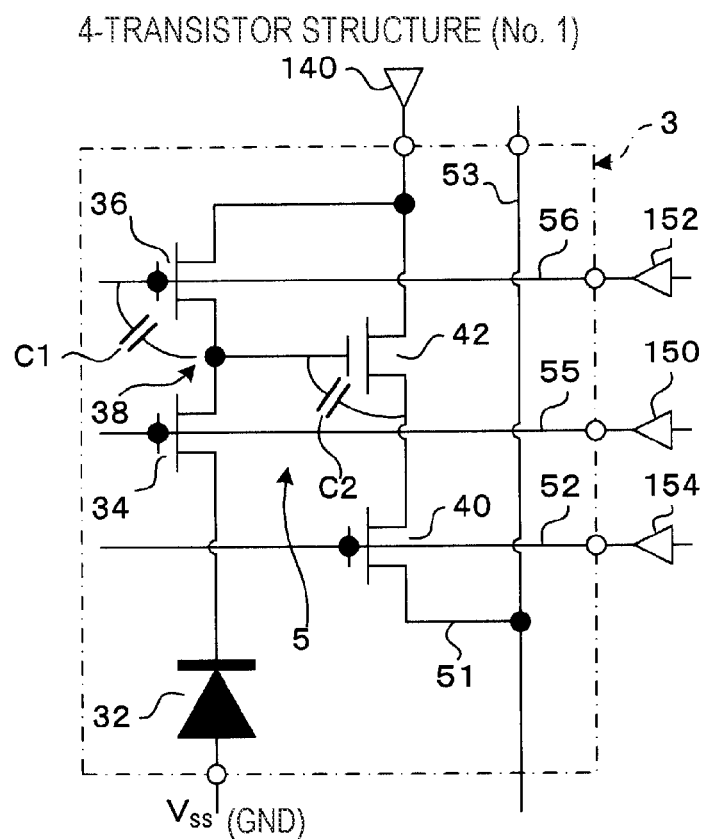
FIGS. 8A and 8B are examples of a structure of a unit pixel of a solid-state imaging device according to a second embodiment of the present invention.
Figure 8B:
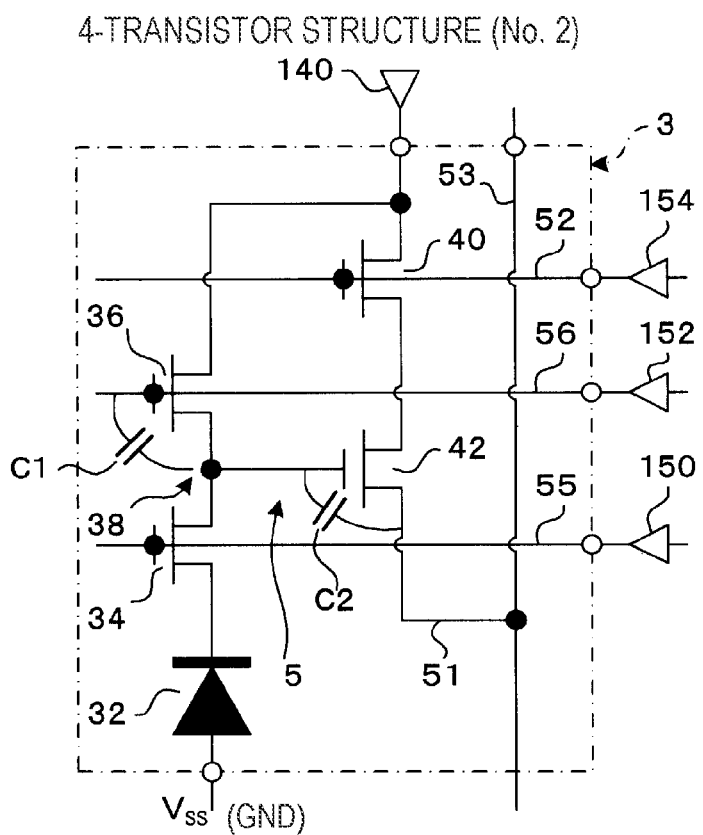

Unit-pixel Structure; the Second Embodiment and its Driving Method; First Example FIGS. 8A and 8B show examples of structures of the unit pixel 3 in the solid-state imaging device 1 according to a second embodiment of the present invention. The entire structure of the solid-state imaging device 1 may be identical to that of the first embodiment shown in FIG. 3A. According to the second embodiment, the unit pixel 3 includes at least the floating diffusion 38 and four transistors.

That is, the unit pixel 3 of this structure includes a charge generation unit 32 having a photoelectric transducer (photodiode), which converts incident light to signal charge and accumulates it; a floating diffusion 38; an amplifying transistor 42 whose gate is connected to the floating diffusion 38; a reset transistor 36 whose drain is connected to a drain of the amplifying transistor 42; a transfer gate transistor 34 for transferring signal charge generated by the charge generation unit 32 to the floating diffusion 38; and the vertical selection transistor 40 for selecting a vertical column. In other words, the unit pixel 3 has the 4TR-structure, which includes the amplifying transistor 42 and the selection transistor connected to the amplifying transistor 42 in series to select the pixel.

In a unit pixel 3 shown in FIG. 8A, among two transistors: amplifying transistor 42 and the vertical selection transistor 40, the vertical selection transistor 40 is connected to the vertical signal line 53. In contrast, in a unit pixel 3 shown in FIG. 8B, the amplifying transistor 42 is connected to the vertical signal line 53. The unit pixel 3 shown in FIG. 8B is identical to that shown in FIG. 1A.

For both structures shown in FIGS. 8A and 8B, if the drain of the reset transistor 36 is not connected to a fixed power supply and can be driven in the same manner as the 3TR-structure, the same driving method described in the first or second example of the first embodiment can be applied. In this case, the driving method described in the first or second example of the first embodiment may be applied when the drain of the reset transistor 36 is driven to a low level, the floating diffusion 38 is set to a low level, and the vertical selection transistor 40 is on.

Driving Method of 4TR-structure; Second Example

Figure 9:
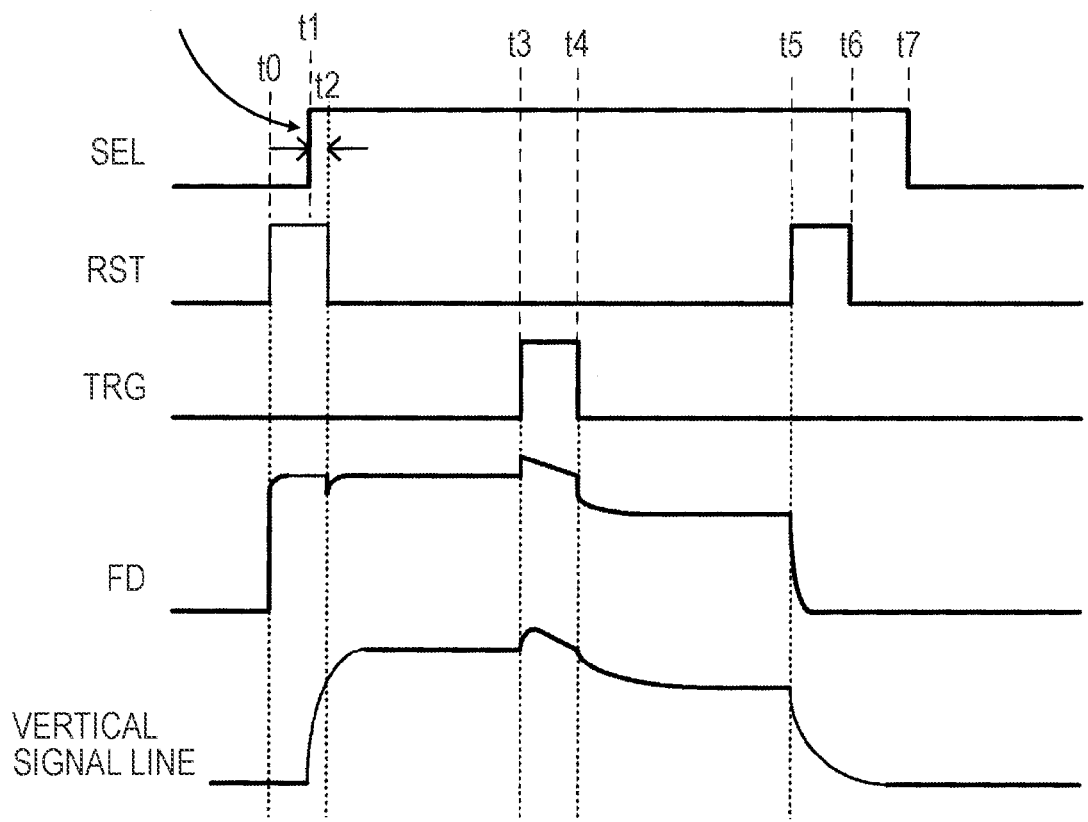
FIG. 9 is a timing chart of a second example of a driving method during reading out of signal charge according to the second embodiment.

FIG. 9 is a timing chart of a second example of a driving method when signal charge is read out according to the second embodiment. This second example of a driving method can be applied only to the unit pixel 3 having the structure in which the amplifying transistor 42 is connected to the vertical signal line 53, as shown in FIG. 8B. In other words, this second example can be applied only to the unit pixel 3 in which the vertical selection transistor 40 is connected to the drain of the amplifying transistor 42.

In the second example of the second embodiment, the target unit pixel 3 is of the 4TR-structure type. Control pulses that cause the floating diffusion 38, which is an example of the charge accumulation unit, to go to a reset level include a reset pulse RST for driving the reset transistor 36 and a selection pulse SEL for driving the vertical selection transistor 40. This second example is characterized by the following driving methods. That is, the vertical selection transistor 40, which is an example of a selection switch unit, is turned on and the reset transistor 36 is simultaneously turned off so as to increase a charge amount of the floating diffusion 38. Alternatively, after the vertical selection transistor 40 is turned on, the reset transistor 36 is turned off in a significantly shorter time than the response time of the vertical signal line 53 so as to increase a charge amount of the floating diffusion 38. These methods will be described below in detail.

FIG. 9 shows a waveform diagram of driving pulses on the transfer gate wire (TRG) 55, the reset gate wire (RST) 56, and a vertical selection line (SEL) 52 during, in particular, a readout interval. For all the pulses, a low level "L" causes the wires to be disabled (inactive) and a high level "H" causes the wires to be enabled (active).

If the vertical selection transistor 40 is connected to the drain of the amplifying transistor 42, the same driving method as that in the first example or second example of the first embodiment can be applied without driving a line connected to the drain of the reset transistor 36.

If the floating diffusion 38 is reset to the power supply voltage level without a Vth drop when the reset pulse RST is high, the operation shown in FIG. 7 should be carried out. Firstly, the reset transistor 36 is turned on (t0) before the selection pulse SEL is turned on. Then, the vertical selection transistor 40 is turned on (t1), and the reset transistor 36 is turned off at the same time or in a sufficiently short time (t2).

Herein, the words "sufficiently short time" mean a significantly short time compared to the response time of the vertical signal line 53. As used herein, the word "significantly" means a degree that a predetermined time period related to control pulses (herein, the reset pulse RST and the selection pulse SEL) is defined as a time period from when the selection pulse SEL turns on the vertical selection transistor 40 until the reset pulse RST turns off the reset transistor 36, that is, an overlap of active time of two pulses, and the predetermined time period is sufficiently short in a practical environment.

Alternatively, this may be a degree that the reset pulse RST is turned off sufficiently early compared to the response time of the vertical signal line 53. In other words, the reset pulse RST first turns on the reset transistor 36, and then the selection pulse SEL turns on the vertical selection transistor 40. The overlap of active time of two pulses should be sufficiently short. If the vertical selection transistor 40 is turned on substantially at the same time as the reset transistor 36 is turned off, the overlap of active time of two pulses is effectively zero.

The second example of the driving method according to the second embodiment is similar to the first example of the driving method according to the first embodiment. While the vertical signal line 53 tracks a change, the voltage of the floating diffusion 38 is increased by the capacity coupling between the vertical signal line 53 and the amplifying transistor 42.

Accordingly, the condition "To drive the reset transistor 36 in a significantly shorter time than the response time of the vertical signal line 53 to the reset pulse RST" can also be precisely defined in the same manner as the first example of the driving method according to the first embodiment.

For example, in a device in which the vertical signal line 53 requires the response time of about 100 ns, an overlap that is shorter than or equal to about a half (50%) of the response time, i.e., 50 ns, can provide a remarkable effect. If the overlap is shorter than or equal to 20 ns, a maximum effect can be provided.

Accordingly, even in the unit pixel 3 of the 4TR-structure in which the vertical selection transistor 40 is connected to the drain of the amplifying transistor 42, by applying this second example of the driving method according to the second embodiment, the power supply voltage can be decreased, that is, lower levels of voltage can be used, and a wide operational margin can be provided. Accordingly, as in the first example of driving, power consumption can be decreased. If a power supply voltage at the same level as the known method is used, the dynamic range can be increased.

Driving Method of 4TR-structure; Third Example

As shown in FIG. 8B, in the unit pixel 3 of the 4TR-structure in which the vertical selection transistor 40 is connected to the drain of the amplifying transistor 42, if the voltage of the floating diffusion 38 becomes the voltage of a Vth drop when the reset pulse RST is at a high level, an overlap of active time between the reset pulse RST and the selection pulse SEL may be long. That is, the following driving timing is allowed. As shown in FIG. 9, the reset transistor 36 is first turned on (t0). Thereafter, the vertical selection transistor 40 is turned on (t1), and then the reset transistor 36 is turned off (t2). At that time, the overlap of active time between the reset pulse RST and the selection pulse SEL is long.

This is because, as in the second example of the driving method according to the first example, although the floating diffusion 38 tracks the reset transistor 36 (reset gate) rapidly, the vertical signal line 53 tracks the change slowly, and therefore, the voltage of the floating diffusion 38 is increased from the value determined by the reset channel. When a Vth drop does not occur, the voltage of the floating diffusion 38 cannot increase since electrons flow in from the drain even though the floating diffusion 38 attempts to increase the voltage.

Therefore, as in the second example of the driving method according to the first embodiment, driving conditions are determined so that the reset transistor 36 is in a Vth drop when the reset pulse RST is at a high level. In this case, the preferable condition may be also defined by using a power supply voltage for the drain of the reset transistor 36 and a second voltage that is slightly lower than the power supply voltage.

Accordingly, even in the unit pixel 3 of the 4TR-structure in which the vertical selection transistor 40 is connected to the drain of the amplifying transistor 42, by applying this third example of a driving method according to the second embodiment, the power supply voltage can be decreased, that is, lower levels of voltage can be used, and a wide operational margin can be provided, as in the second example of driving method according to the first embodiment. Accordingly, as in the first example of a driving method in the first embodiment, power consumption can be decreased. If a power supply voltage at the same level as the known method is used, the dynamic range can be increased.

Figure 10:
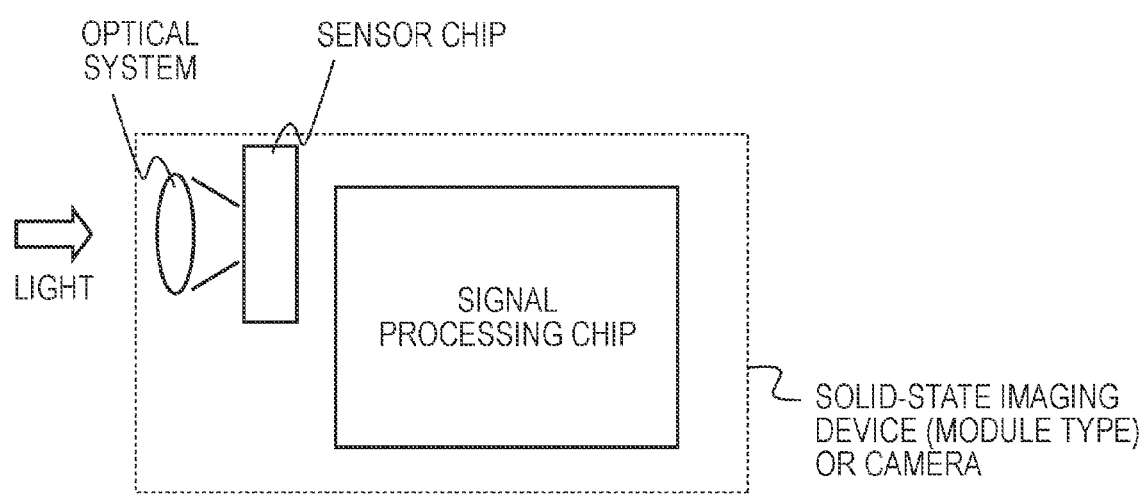
FIG. 10 is an example of the solid-state imaging device according to the present invention.

Furthermore, according to the present invention, a solid-state imaging device may be a one-chip type solid-state imaging device, or may be a module type solid-state imaging device formed from a plurality of chips. For example, as shown in FIG. 10, a module type solid-state imaging device includes a sensor chip for imaging and a signal processing chip for processing a digital signal. The module type solid-state imaging device may further include an optical system.

When the present invention is applied to a camera, the camera can reduce its power consumption and can provide imaging pictures of wide dynamic range.

Although the present invention has been shown and described with reference to the foregoing embodiments, the technical scope of the present invention is not limited to the scope described in the foregoing embodiments. Various changes and modifications may be made therein without departing from the spirit and scope of the present invention, and such embodiments are intended to be encompassed in the technical scope of the present invention.

The present invention defined by the appended claims is not limited to the foregoing embodiments. All the combinations of features described in the foregoing embodiments are not necessarily mandatory for the solving means of the present invention. The foregoing embodiments include various stages of the present invention and various inventions can be extracted by appropriately combining a plurality of disclosed components and factors. Although some components and factors are removed from the structures described in the foregoing embodiments, the structures from which these components and factors are removed can be extracted as inventions as long as the structures provide the effect.

For example, the driving methods described above in detail are only features related to the present invention. In practice, for example, although FIG. 4 shows that the vertical drain line 57 is normally at a high level and a low-level pulse is applied after pixel readout, the vertical drain line 57 may be normally at a low level and a high-level pulse is applied during pixel readout time. This driving operation does not change the foregoing description at all. Additionally, in stages other than the pixel readout, other operations that are not described above, such as an operation of an electronic shutter, are carried out and therefore, in practice, the stages are variously modified. Since the specific methods for the modification will be easily understood by those skilled in the art, descriptions thereof are not included herein.

Additionally, for example, although the foregoing embodiments have been described with reference to a pixel signal generation unit 5 of the FDA structure in which a floating diffusion, an example of a charge injection unit, is used as the charge accumulation unit, the pixel signal generation unit 5 need not be of the FDA type. For example, a floating gate FG, which is an example of a charge injection unit, may be disposed on a substrate under a transfer electrode, and a detection method may be used in which a potential change of the floating gate FG caused by a change of signal charge passing through a channel under the floating gate FG is used.

Also, although the foregoing embodiments have been described with reference to the structure having a transfer electrode, the structure may be a virtual gate (VG) structure that has no transfer electrode.

Also, although the foregoing embodiments have been described with reference to a solid-state imaging device having a unit pixel that includes a charge generation unit, a floating diffusion, and three or four MOS transistors, the above-described structures and methods only require a condition that a charge generation unit, such as a photodiode, is separated from a charge accumulation unit, such as a floating diffusion, by charge transfer means. For example, a modification is made by using a JFET to achieve the same function.

In addition, although the foregoing embodiments have been described with reference to a solid-state imaging device of the column type in which output signals from pixels arranged in rows and columns are voltage signals, and a CDS processing function unit is disposed for each vertical column, a circuit structure that suppresses offset fixed pattern noise from one stream of an imaging signal may be used instead of the column type circuit.

What is claimed is:

1. A semiconductor device comprising:
a signal acquisition unit comprising a unit component comprising a charge generation unit for generating signal charge in response to incident electromagnetic waves, a charge accumulation unit for accumulating the signal charge generated by the charge generation unit, a signal generation unit for generating a signal in accordance with the signal charge accumulated in the charge accumulation unit, and a reset unit for resetting the charge accumulation unit; and
a driving control unit for using control pulses to cause the charge accumulation unit to go to a reset level so as to increase an amount of charge to be accumulated in the charge accumulation unit.

2. The semiconductor device according to claim 1, wherein the control pulses comprise a reset pulse for driving the reset unit, and the driving control unit operates such that a predetermined time period related to the control pulses is significantly shorter than a response time of a signal appearing on an output signal line of the signal generation unit in response to the reset pulse.

3. The semiconductor device according to claim 2, wherein the driving control unit operates while considering the predetermined time period related to the control pulses as a width of one of the control pulses.

4. The semiconductor device according to claim 2, wherein the unit component further comprises a selection switch unit for selecting one of the signal generation units in the signal acquisition unit, the selection switch unit being connected to a power supply line at the opposite side of the output signal line of the signal generation unit, the control pulses comprise a reset pulse for driving the reset unit and a selection pulse for driving the selection switch unit, and the driving control unit operates while considering the predetermined time period related to the control pulses as a time period from when the selection pulse turns on the selection switch unit until the reset pulse turns off the reset unit.

5. The semiconductor device according to claim 4, wherein the driving control unit turns on the selection switch unit by the selection pulse and turns off the reset unit by the reset pulse at the same time.

6. The semiconductor device according to claim 2, wherein the driving control unit operates such that the predetermined time period related to the control pulses is shorter than or equal to ½ of the response time of the signal appearing on the output signal line of the signal generation unit in response to the reset pulse.

7. The semiconductor device according to claim 6, wherein the driving control unit operates such that the predetermined time period related to the control pulses is shorter than or equal to ⅕ of the response time of the signal appearing on the output signal line of the signal generation unit in response to the reset pulse.

8. The semiconductor device according to claim 2, wherein the driving control unit operates such that the predetermined time period related to the control pulses is shorter than or equal to one clock of a master clock used for the driving control unit.

9. The semiconductor device according to claim 8, wherein the driving control unit operates such that the predetermined time period related to the control pulses is shorter than or equal to a half clock of the master clock used for the driving control unit.

10. The semiconductor device according to claim 2, wherein the driving control unit operates such that the predetermined time period related to the control pulses is shorter than or equal to 40 nanoseconds (ns).

11. The semiconductor device according to claim 10, wherein the driving control unit operates such that the predetermined time period related to the control pulses is shorter than or equal to 20 nanoseconds (ns).

12. The semiconductor device according to claim 2, wherein the driving control unit operates such that the charge accumulation unit is sufficiently reset in response to the driving of the reset pulse within the predetermined time period related to the control pulses.

13. The semiconductor device according to claim 1, wherein the control pulses comprise a reset pulse for driving the reset unit, and the driving control unit operates such that, when the reset pulse is turned to active, the reset unit goes to a Vth drop within a predetermined voltage range.

14. The semiconductor device according to claim 13, wherein the driving control unit operates such that the predetermined voltage range is from a power supply voltage minus 0.5 V to the power supply voltage.

15. The semiconductor device according to claim 13, wherein the unit component further comprises a selection switch unit for selecting one of the signal generation units in the signal acquisition unit, the selection switch unit being connected to a power supply line at the opposite side of an output signal line of the signal generation unit, the control pulses comprise a reset pulse for driving the reset unit and a selection pulse for driving the selection switch unit, and the driving control unit turns on the reset unit by using the reset pulse before turning on the selection switch unit by using the selection pulse, and then turns on the selection switch unit by using the selection pulse and turns off the reset unit by using the reset pulse at the same time or thereafter.

16. A driving control device for driving a unit component of a semiconductor device, the unit component comprising a charge generation unit for generating signal charge in response to incident electromagnetic waves, a charge accumulation unit for accumulating the signal charge generated by the charge generation unit, a signal generation unit for generating a signal in accordance with the signal charge accumulated in the charge accumulation unit, and a reset unit for resetting the charge accumulation unit, the device comprising a driving control unit for using control pulses to cause the charge accumulation unit to go to a reset level so as to increase an amount of charge to be accumulated in the charge accumulation unit.

17. The driving control device according to claim 16, wherein the driving control unit comprises a pulse signal generation unit for generating a reset pulse for driving the reset unit as one of the control pulses, and the driving control unit operates such that a predetermined time period related to the control pulses is significantly shorter than a response time of a signal appearing on an output signal line of the signal generation unit in response to the reset pulse.

18. The driving control device according to claim 16, wherein the driving control unit comprises a pulse signal generation unit for generating a reset pulse for driving the reset unit as one of the control pulses, and the driving control unit operates such that, when the reset pulse is turned to active, the reset unit goes to a Vth drop within a predetermined voltage range.

19. The semiconductor device according to claim 1, further comprising an optical system for guiding the electromagnetic waves to the signal acquisition unit.

20. A camera comprising:
  a signal acquisition unit comprising a unit component comprising a charge generation unit for generating signal charge in response to incident electromagnetic waves, a charge accumulation unit for accumulating the signal charge generated by the charge generation unit, a signal generation unit for generating a signal in accordance with the signal charge accumulated in the charge accumulation unit, and a reset unit for resetting the charge accumulation unit;
  a driving control unit for using control pulses to cause the charge accumulation unit to go to a reset level so as to increase an amount of charge to be accumulated in the charge accumulation unit; and
  an optical system for guiding the electromagnetic waves to the signal acquisition unit.

* * * * *